May 1, 1923.

E. A. LEFEBRE

AMPLIFIER

Filed May 19, 1922

1,453,879

Edward A. Lefebre.
INVENTOR

BY Victor J. Evans
ATTORNEY

WITNESS: Fred W. Ely

Patented May 1, 1923.

1,453,879

UNITED STATES PATENT OFFICE.

EDWARD A. LEFEBRE, OF ASTORIA, NEW YORK.

AMPLIFIER.

Application filed May 19, 1922. Serial No. 562,174.

*To all whom it may concern:*

Be it known that I, EDWARD A. LEFEBRE, a citizen of the United States, residing at Astoria, in the county of Queens and State of New York, have invented new and useful Improvements in Amplifiers, of which the following is a specification.

This invention relates to acoustics generally.

My invention is specifically intended to be incorporated in a wireless apparatus and it can be employed in connection with either a sending or receiving instrument. Its use is particularly directed to the augmentation of sound as the latter is taken from the customary receiving or acoustical instrument or sonorous body and an object of the invention is to provide a sounding chamber or board as the case may be, wherein same and the air around it or which it contains will be made to vibrate in unison with the receiving instrument or sonorous body with which the invention is used. When the sounding board is made to vibrate in the manner described, the strengthening of the sound is very remarkable and this strengthening action is induced by a means which will positively guard against undue distortion or choking of the sound as it is conveyed to its amplifying point.

A still further object of the invention is to provide a sound amplifying instrument or device which will adapt itself to the customary acoustical instruments used in connection with radio equipment without requiring any changes in the construction thereof.

A further object of the invention is to provide an amplifying device or instrument including a sound amplifying chamber, grooved means associated therewith and adapted to be correlated with an acoustical instrument so as to define therewith a duct for the propagation of sound from the acoustical instrument to the expanding or amplifying chamber.

A still further object of the invention is to provide a sound amplifying device or instrument which can be incorporated with an acoustical receiving instrument and the parts correlated so as to guard against extraneous distortion or interferences.

A still further object of the invention is to provide an amplifier device or instrument which will be portable, compact, simple of construction and inexpensive of manufacture, while possessing the qualities and characteristics of more costly amplifiers.

A still further object of the invention is to provide an amplifying device or instrument embodying an expanding chamber whose walls are so formed as to throw the sound out and render it clearly audible.

With the above and other objects in view which will appear as the nature of the invention is better understood, the same consists in the improved construction and novel arrangements of parts which will hereinafter be fully described and particularly pointed out in the claims.

In the accompanying drawings, has been illustrated, a single and preferred form of the invention, it being, however, understood that no limitations are necessarily made to the precise structural details therein exhibited, but that changes, alterations and modifications within the scope of the claims may be resorted to when desired.

Figure 1:
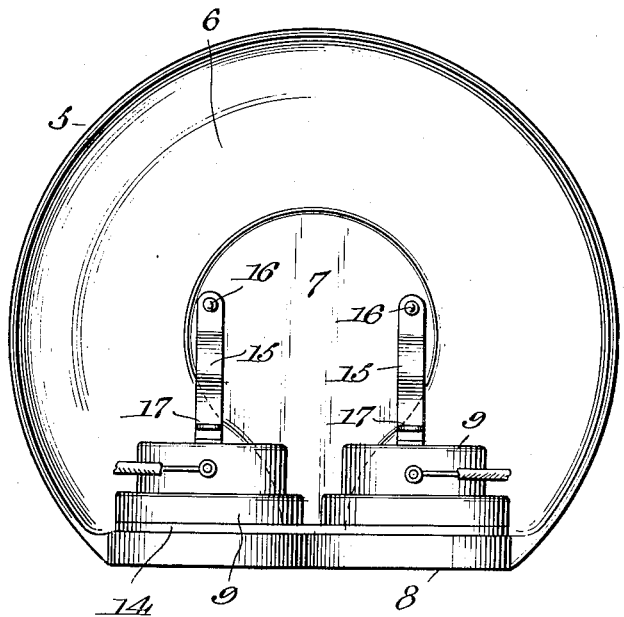
Figure 1, is a front view of the device.

In carrying the invention into practice, I do not wish to limit myself to any particular shape of the invention, nor do I care to confine myself to the manufacture of the invention of any fixed character of material. An essential feature of the invention is the provision of a sounding board whose walls define an amplifying chamber, the said board having incorporated therewith, grooved means adapted to be correlated to the customary acoustical receiving instrument of the type employing a vibratory membrane or diaphragm which is controlled through sound waves and which operates with the grooved means to produce or define therewith a sound propagation duct leading to the board so as to provide for an unobstructed and unchoked expansion of the sound as it leaves the duct. Aside from this broad principle of the invention, I am not particularly interested in the precise details of construction nor to shapes of the invention or the kinds of materials employed in the manufacture thereof. As an illustration of one form of my invention, reference may be had to Figures 1 to 3, inclusive of the drawing, wherein is illustrated a substantially semi-spherical sounding board 5. This produces a bowl-like structure having a sound expanding or amplifying chamber or cavity 6. It is preferred that the wall 7 of the structure extend upward and rearward at an angle from the base 8 and from the approximate center of the wall 7, the walls are curved outward at the sides and upward at the top of said approximate center so that the sound may be projected effectively to a point in front of the open side of the chamber.

Figure 2:
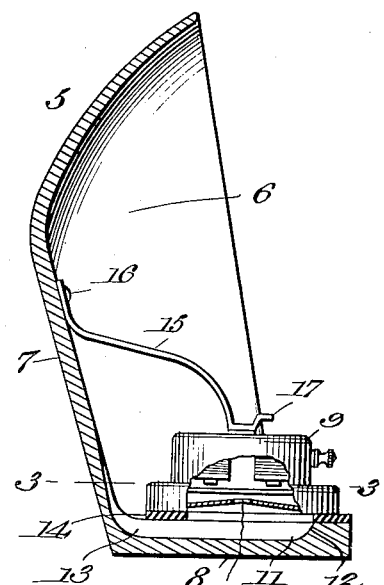
Figure 2, is a vertical section therethrough.
Figure 3:
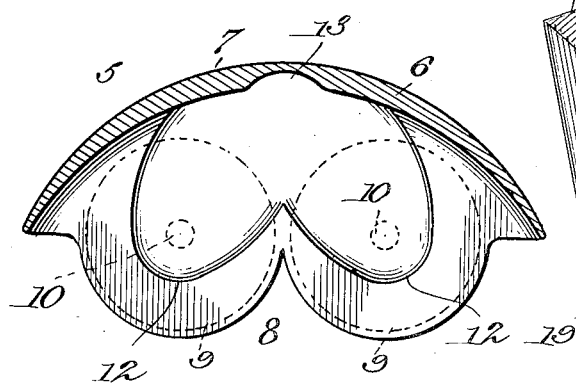
Figure 3, is a section taken on line 3—3 of Figure 2.

The base 8 constitutes a means for the incorporation with the structure of an acoustical instrument of the type conventionally shown at 9, in Figures 1 and 2. These instruments are known as receivers when employed in connection with radio apparatus and they each include a vibratory or sonorous diaphragm or membrane which is associated at one side of an aperture 10. The apertures are arranged at the central portions of the receiving instruments in the customary manner. The means or base 8, is provided with grooves 11—11. These grooves respectively extend at opposite angles across the base or means 8, at the opposite sides of the medial center of the latter. At the outer ends, the grooves are closed at 12. At the inner ends, the grooves intersect each other at 13. In other words, they merge together and also directly on to the surface of the sound board in juxtaposition with the amplifying chamber 6.

Two of these receivers are used in connection with the device from the nature of the aforesaid construction of the means or base 8, and they are arranged on the base with their apertures opening downward into the grooves 11. In this manner, the walls of the receivers act to define with the grooves 11, what I will hereinafter describe as propagation ducts, the same having a common outlet at the point of intersection 13, of said grooves. A gasket 14 of yieldable or elastic material is arranged upon the upper face of the base or means 8 and the same extends entirely around the margin of the grooves 11. This gasket forms a sealing cushion which when brought to bear with slight force against the walls of the receiving instruments seal and space between the walls and said gasket so as to prevent distortion by extraneous sounds and for causing the vibrations of the instruments to be discharged wholly in the grooves 11. To induce pressure upon these receiving instruments when arranged upon the base or means 8 as above mentioned, I employ elastic devices 15 fixed or suitably supported at 16, to the body of the sounding board. The free ends 17 of these devices bear against the exposed upper walls of the receiving instruments so as to maintain tight contact of the lower walls with said gasket.

I find that my invention can be employed in connection with a single receiving instrument or it can be used in connection with a multiplicity of such instruments, two being preferred. The sound is greatly augmented by the use of two receivers. I also find that by moving the receiving instruments angularly at their points toward the juncture 13, the sound is further changed and amplified. This adjustment can be made by the insertion of suitable elevating elements beneath the receivers, the same acting against the tension of the spring devices 15. The adjustment acts to respectively enlarge and decrease the combined area of the juncture 13.

Figure 4:
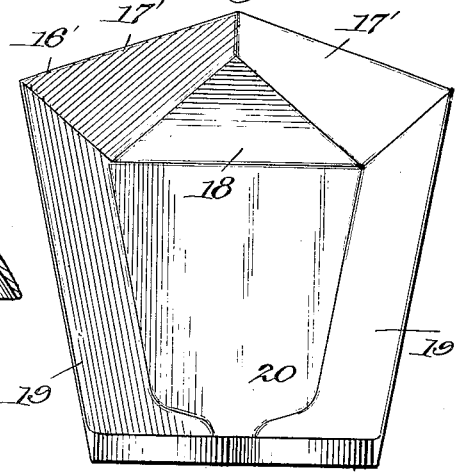
Figure 4, is a view similar to Figure 1, showing a slightly modified form of the invention.

In Figure 4, the sound board 16' is of key-stone formation, the same having angular walls 17'—17', 18 and 19—19, all of which extend from a wall 20. All of these walls are related to one another so as to constitute an air chamber of a kind in conformity with the one shown and described at 6, in the first embodiment of the invention. Except for this change in the construction, this modified form of my invention is identical with the first embodiment thereof.

What is claimed as new is:—

1. A sound amplifier embodying a sound board having grooved means, said means formed so that the groove thereof when associated with an acoustical instrument will define therewith a sound propagation duct opening directly to the sounding board.

2. The combination with a sounding board having a grooved portion, of a sonorous body associated with the groove so as to define a propagation duct, as and for the purpose specified.

3. A sound amplifier embodying a bowl-like sounding board provided with a horizontal supporting base, said base having a groove extending to the board and adapted for association with an acoustical receiving instrument so that the latter and the groove define a sound propagation duct correlated with the board for the amplification of sound over its volume as directly taken from said acoustical instrument.

4. A portable amplifier comprising a horizontal base member and an open sided bowl-like body rising from said member, the base having a groove formed in its upper surface opening at one end to said body.

5. An amplifier comprising a grooved member adapted to be associated with an acoustical sound receiving instrument so as to define therewith a duct, elastic means for sealing the instrument against the sides of the groove, and means for holding the instrument in confinement with the elastic sealing means.

6. A sound amplifier comprising a grooved member having a yieldable surface extending around the groove, means for yieldingly pressing an acoustical receiving instrument against said surface, and a sound amplifying body in communication with said groove.

7. In means for the augmentation of sound as same is set up in an acoustical receiving instrument, an amplifier embodying a body having a chamber open at one side for full exposure to atmospheric air, and means for correlating an acoustical receiving instrument with a portion of said body so as to form a sound duct for connecting the instrument with said chamber, said duct extending to said chamber.

8. A device of the class described comprising a bowl-like body, means forming a support for the body to hold the latter in a substantially upright position to fully expose the open side of the body to surrounding atmospheric air, and means on the supporting means for positioning an acoustical instrument in sound conveying relation to said bowl-like body.

In testimony whereof I have affixed my signature.

EDWARD A. LEFEBRE.